United States Patent
Park et al.

(10) Patent No.: US 9,312,945 B2
(45) Date of Patent: Apr. 12, 2016

(54) METHOD FOR REPORTING DOWNLINK CHANNEL STATE AND APPARATUS THEREFOR

(71) Applicant: LG Electronics Inc., Seoul (KR)

(72) Inventors: Hanjun Park, Seoul (KR); Kijun Kim, Seoul (KR); Jonghyun Park, Seoul (KR)

(73) Assignee: LG Electronics Inc., Seoul (KR)

( * ) Notice: Subject to any disclaimer, the term of this patent is extended or adjusted under 35 U.S.C. 154(b) by 51 days.

(21) Appl. No.: 14/193,131

(22) Filed: Feb. 28, 2014

(65) Prior Publication Data

US 2014/0241190 A1 Aug. 28, 2014

Related U.S. Application Data

(60) Provisional application No. 61/770,326, filed on Feb. 28, 2013.

(51) Int. Cl.
*H04W 24/00* (2009.01)
*H04B 7/10* (2006.01)
*H04B 7/04* (2006.01)
*H04B 7/06* (2006.01)

(52) U.S. Cl.
CPC ............ *H04B 7/10* (2013.01); *H04B 7/0469* (2013.01); *H04B 7/0478* (2013.01); *H04B 7/0486* (2013.01); *H04B 7/065* (2013.01); *H04B 7/066* (2013.01); *H04B 7/0639* (2013.01)

(58) Field of Classification Search
None
See application file for complete search history.

(56) References Cited

U.S. PATENT DOCUMENTS

| 2009/0080549 A1* | 3/2009 | Khan et al. | 375/260 |
| 2011/0216846 A1* | 9/2011 | Lee et al. | 375/295 |
| 2013/0114655 A1* | 5/2013 | Gomadam | 375/219 |

OTHER PUBLICATIONS

"3rd Generation Partnership Project; Technical Specification Group Radio Access Network; Evolved Universal Terrestrial Radio Access (E-UTRA); Physical layer procedures (Release 11)," 3GPP TS 36.213 V11.1.0, Dec. 2012.
"3rd Generation Partnership Project; Technical Specification Group Radio Access Network; Evolved Universal Terrestrial Radio Access (E-UTRA); Physical Channels and Modulation (Release 10)," 3GPP TS 36.211 V10.6.0, Dec. 2012.
"3rd Generation Partnership Project; Technical Specification Group Radio Access Network; Evolved Universal Terrestrial Radio Access (E-UTRA); Physical layer procedures (Release 10)," 3GPP TS 36.213 V10.8.0, Dec. 2012.
"3rd Generation Partnership Project; Technical Specification Group Radio Access Network; Evolved Universal Terrestrial Radio Access (E-UTRA); Physical Channels and Modulation (Release 11)," 3GPP TS 36.211 V11.1.0, Dec. 2012.
"3rd Generation Partnership Project; Technical Specification Group Radio Access Network; Evolved Universal Terrestrial Radio Access (E-UTRA); Physical Channels and Modulation (Release 9)," 3GPP TS 36.211 V9.1.0, Mar. 2010.
"3rd Generation Partnership Project; Technical Specification Group Radio Access Network; Evolved Universal Terrestrial Radio Access (E-UTRA); Physical layer procedures (Release 9)," 3GPP TS 36.213 V9.3.0, Sep. 2010.

* cited by examiner

*Primary Examiner* — Omar Ghowrwal
(74) *Attorney, Agent, or Firm* — Morgan, Lewis & Bockius LLP

(57) ABSTRACT

A method for reporting a channel state to a base station (BS) supporting downlink (DL) multiple-input multiple-output (MIMO) in a wireless communication system includes measuring a DL channel based on a DL signal received from the BS, and reporting an index of a codebook for precoding of the DL signal according to the measured DL channel, wherein the codebook for precoding includes an integrated codebook having a dual structure including a codebook for a wideband and a codebook for a subband, and wherein the integrated codebook is determined depending on an index $i_1$ of the codebook for the wideband and an index $i_2$ of the codebook for the subband, and a structure or type of a codebook selectable using the index $i_2$ varies according to the index $i_1$.

11 Claims, 7 Drawing Sheets

FIG. 5
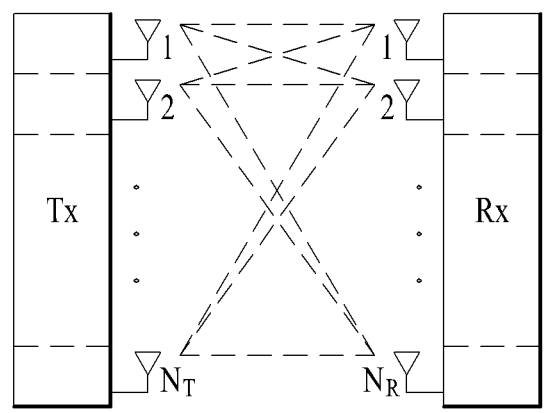
(a)
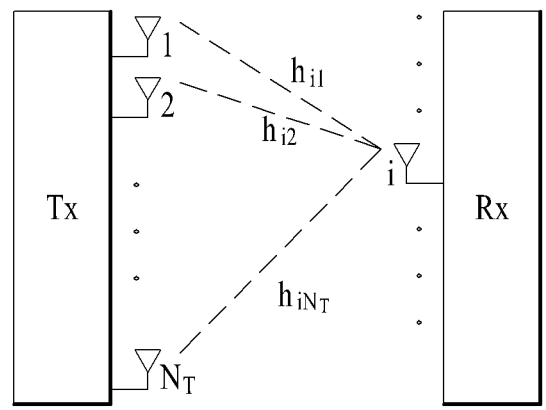
(b)

METHOD FOR REPORTING DOWNLINK CHANNEL STATE AND APPARATUS THEREFOR

Pursuant to 35 U.S.C. §119(e), this application claims the benefit of U.S. Provisional Application No. 61/770,326, filed on Feb. 28, 2013, which is hereby incorporated by reference as if fully set forth herein.

BACKGROUND OF THE INVENTION

1. Field of the Invention

The present invention relates to a wireless communication system and, more particularly, to a method for reporting a downlink (DL) channel state and an apparatus therefor.

2. Discussion of the Related Art

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

SUMMARY OF THE INVENTION

Accordingly, the present invention is directed to a method for reporting a downlink (DL) channel state and an apparatus therefor that substantially obviates one or more problems due to limitations and disadvantages of the related art.

An object of the present invention is to provide a method for efficiently receiving a wireless signal.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for reporting a channel state to a base station (BS) supporting downlink (DL) multiple-input multiple-output (MIMO) in a wireless communication system includes measuring a DL channel based on a DL signal received from the BS; and reporting an index of a codebook for precoding of the DL signal according to the measured DL channel, wherein the codebook for precoding includes an integrated codebook having a dual structure including a codebook for a wideband and a codebook for a subband, and wherein the integrated codebook is determined depending on an index $i_1$ of the codebook for the wideband and an index $i_2$ of the codebook for the subband, and a structure or type of a codebook selectable using the index $i_2$ varies according to the index $i_1$.

Preferably, the codebook for the subband may include a sub-codebook obtained by sub-sampling the codebook for the subband according to antenna polarization characteristics.

Preferably, the method may include receiving information about a type of the integrated codebook used by the BS, from the BS, and the integrated codebook may include at least one of all legacy (Rel-8) codebooks for 4 transport (Tx) antenna ports, all improved 4Tx codebooks obtained by reflecting linear phase increment (LPI) characteristics to the legacy codebooks, a first sub codebook obtained by sub-sampling the improved 4Tx codebook according to a co-polarized antenna structure, and a second sub codebook obtained by sub-sampling the improved 4Tx codebook according to a cross-polarization antenna structure.

Preferably, the codebook for the wideband among the improved 4Tx codebooks may be represented as $$W_1(i) = \begin{bmatrix} \tilde{W}_1(i) & 0 \\ 0 & \tilde{W}_1(i)D_a(i) \end{bmatrix},$$

$$i \in \{0, 1, \ldots, 7\};$$

$$\tilde{W}_1(i) = \begin{bmatrix} 1 & 1 & 1 & 1 \\ e^{j\frac{2\pi(2i \bmod 16)}{16}} & e^{j\frac{2\pi((2i+1) \bmod 16)}{16}} & e^{j\frac{2\pi((2i+2) \bmod 16)}{16}} & e^{j\frac{2\pi((2i+3) \bmod 16)}{16}} \end{bmatrix}$$

$$\{D_a(i)\}_{pq} = \begin{cases} e^{2 \cdot j \frac{2\pi \cdot ((2i+p) \bmod 16)}{16}}, & p = q \\ 0, & p \neq q. \end{cases}$$

Preferably, the codebook for the subband among the improved 4Tx codebooks may be represented as $$W_2(m, n) = \begin{bmatrix} e_n \\ e^{j\frac{\pi m}{2}} e_n \end{bmatrix}$$

for rank 1, where $m \in \{0, 1, 2, 3\}$ and $n \in \{1,2,3,4\}$; and $$W_2(m, n_1, n_2) = \begin{bmatrix} e_{n_1} & e_{n_2} \\ e^{j\frac{\pi m}{2}} e_{n_1} & -e^{j\frac{\pi m}{2}} e_{n_2} \end{bmatrix}$$

for rank 2, where $m \in \{0,1\}$ and $(n_1, n_2) \in \{(1,1), (2,2), (3,3), (4,4), (1,2), (2,3), (1,4), (2,4)\}$, where $e_n$ is a vector for selecting one of four elements, and only an n-th element is defined as 1 while other values are defined as 0.

Preferably, the first sub codebook may be represented as $$W_2(m, n) = \begin{bmatrix} e_n \\ e_n \end{bmatrix}$$

for rank 1, where $n \in \{1,2,3,4\}$; and $$W_2(m, n_1, n_2) = \begin{bmatrix} e_{n_1} & e_{n_2} \\ e_{n_1} & -e_{n_2} \end{bmatrix}$$

for rank 2, where $(n_1, n_2) \in \{(1,1), (2,2), (3,3), (4,4)\}$, where $e_n$ is a vector for selecting one of four elements, and only an n-th element is defined as 1 while other values are defined as 0.

Preferably, the second sub codebook may be represented as $$W_2(m, n) = \begin{bmatrix} e_1 \\ e^{j\frac{\pi m}{2}} e_1 \end{bmatrix}$$

for rank 1, where $m \in \{0, 1, 2, 3\}$; and $$W_2(m, n_1, n_2) = \begin{bmatrix} e_{n_1} & e_{n_2} \\ e^{j\frac{\pi m}{2}} e_{n_1} & -e^{j\frac{\pi m}{2}} e_{n_2} \end{bmatrix}$$

for rank 2, where $m \in \{0,1\}$ and $(n_1, n_2) \{(1,1), (3,3)\}$, where $e_n$ is a vector for selecting one of four elements, and only an n-th element is defined as 1 while other values are defined as 0.

Preferably, when three bits are set for the codebook for the wideband, if the three bits indicate 0, the codebook for the wideband may be set as an identity matrix and the codebook for the subband may be set as the legacy (Rel-8) codebook for 4Tx antenna ports.

Preferably, when three bits are set for the codebook for the wideband, if the three bits indicate 1 to 7, the codebook for the wideband may be set as an identity matrix and the codebook for the subband may be set as the improved 4Tx codebook.

In another aspect of the present invention, a user equipment (UE) configured to report a channel state to a base station (BS) supporting downlink (DL) multiple-input multiple-output (MIMO) in a wireless communication system includes a radio frequency (RF) unit; and a processor configured to control the RF unit, wherein the processor is configured to measure a DL channel based on a DL signal received from the BS and to report an index of a codebook for precoding of the DL signal according to the measured DL channel, wherein the codebook for precoding includes an integrated codebook having a dual structure including a codebook for a wideband and a codebook for a subband, and wherein the integrated codebook is determined depending on an index $i_1$ of the codebook for the wideband and an index $i_2$ of the codebook for the subband, and a structure or type of a codebook selectable using the index $i_2$ varies according to the index $i_1$.

In another aspect of the present invention, a base station (BS) supporting downlink (DL) multiple-input multiple-output (MIMO) in a wireless communication system includes a radio frequency (RF) unit; and a processor configured to control the RF unit, wherein the processor is configured to transmit a downlink (DL) signal to a user equipment (UE) and to receive an index of a codebook for precoding of the DL signal according to a DL channel measured based on the DL signal, wherein the codebook for precoding includes an integrated codebook having a dual structure including a codebook for a wideband and a codebook for a subband, and wherein the integrated codebook is determined depending on an index $i_1$ of the codebook for the wideband and an index $i_2$ of the codebook for the subband, and a structure or type of a codebook selectable using the index $i_2$ varies according to the index $i_1$.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 is a block diagram showing a multi-input multi-output (MIMO) used in a 3GPP LTE/LTE-A system;

DETAILED DESCRIPTION OF THE INVENTION

Figure 1:
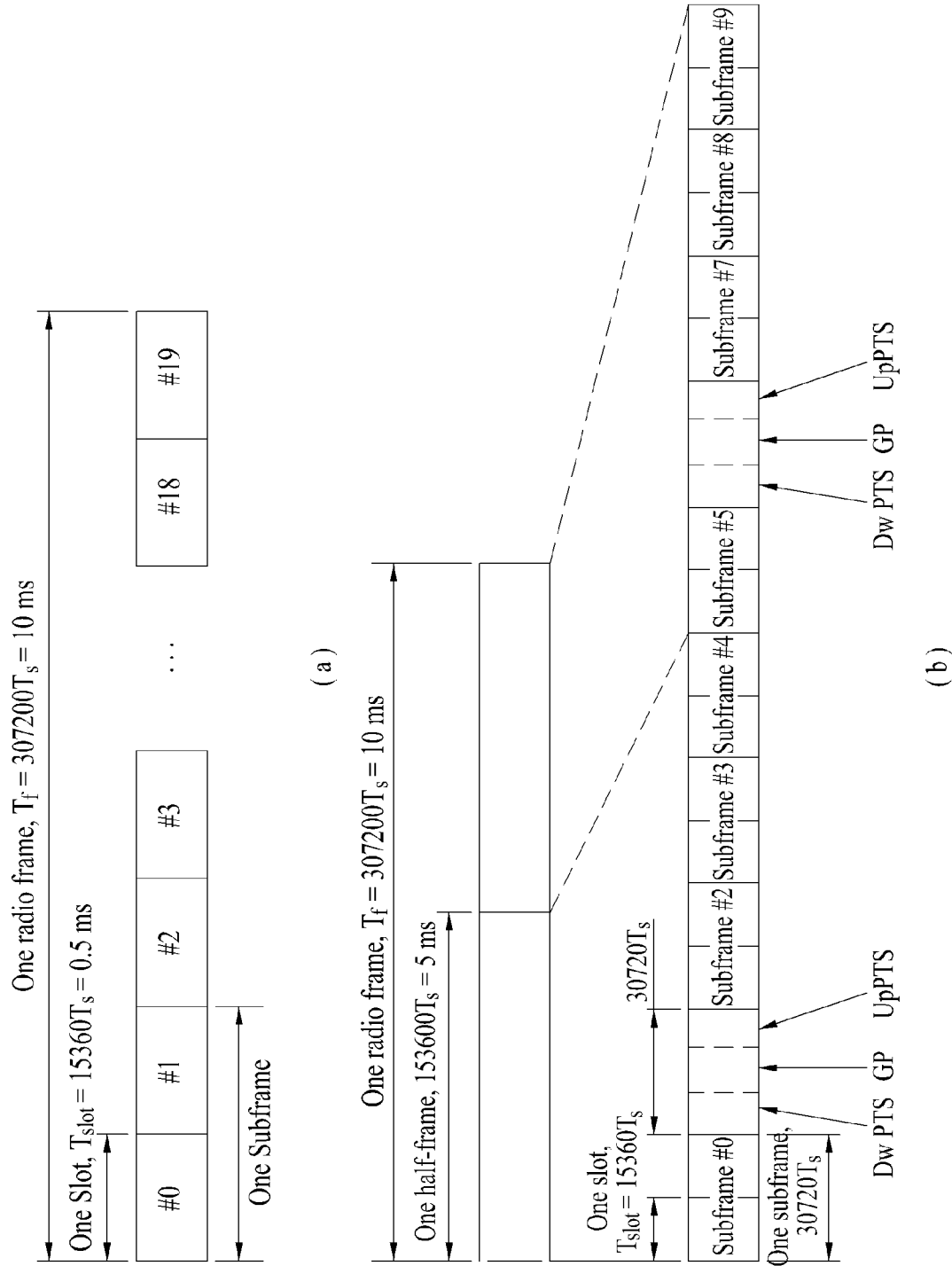
FIG. 1 is a diagram showing an example of a radio frame structure used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g. macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming) DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowlegement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$  | $2192 \cdot T_s$ | $2560 \cdot T_s$ | $7680 \cdot T_s$  | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |

TABLE 2-continued

|  | Normal cyclic prefix in downlink | | | Extended cyclic prefix in downlink | | |
| --- | --- | --- | --- | --- | --- | --- |
|  |  | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 3 | $24144 \cdot T_s$ |  |  | $25600 \cdot T_s$ |  |  |
| 4 | $26336 \cdot T_s$ |  |  | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ |  |  |
| 6 | $19760 \cdot T_s$ |  |  | $23040 \cdot T_s$ |  |  |
| 7 | $21952 \cdot T_s$ |  |  | — | — | — |
| 8 | $24144 \cdot T_s$ |  |  | — | — | — |

Figure 2:
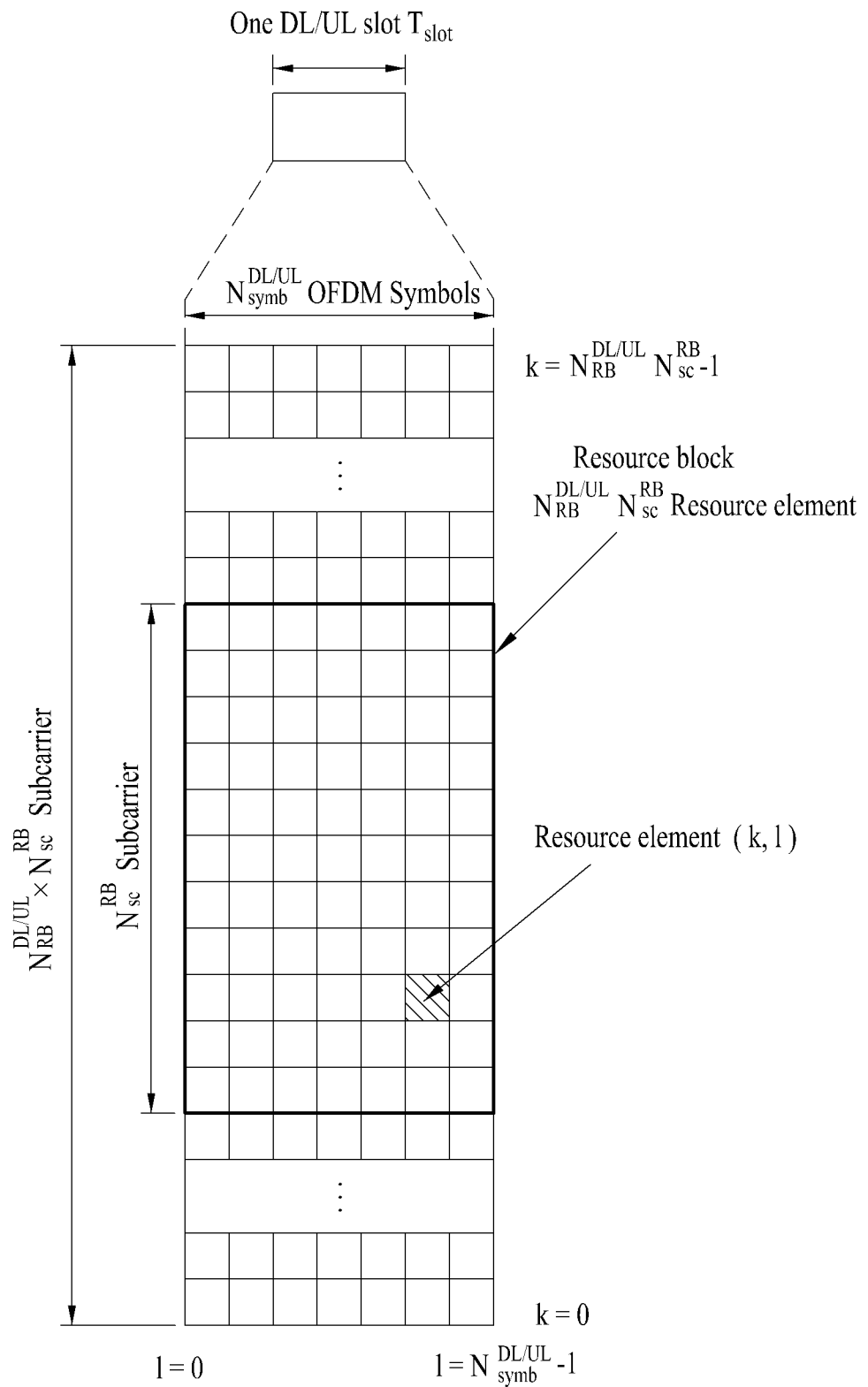
FIG. 2 is a diagram showing an example of a downlink/uplink (DL/UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g. 7) consecutive OFDM symbols in the time domain and $N_{sc}^{RB}$ (e.g. 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, 1) in a slot. Here, k is an index in the range of 0 to $N_{symb}^{DL/UL} * N_{sc}^{RB} - 1$ in the frequency domain and 1 is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index).

Figure 3:
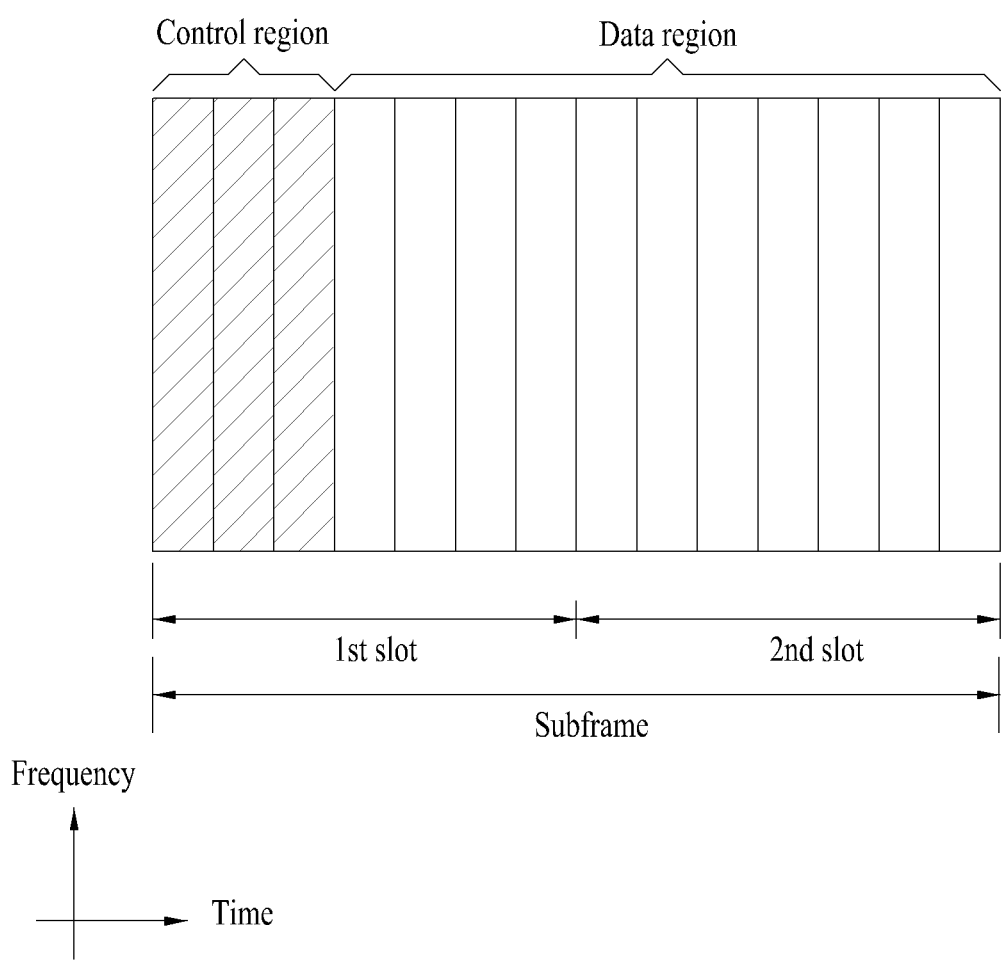
FIG. 3 is a diagram showing a downlink (DL) subframe structure used in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared channel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g. frequency position) of "B" and transmission format information (e.g. transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
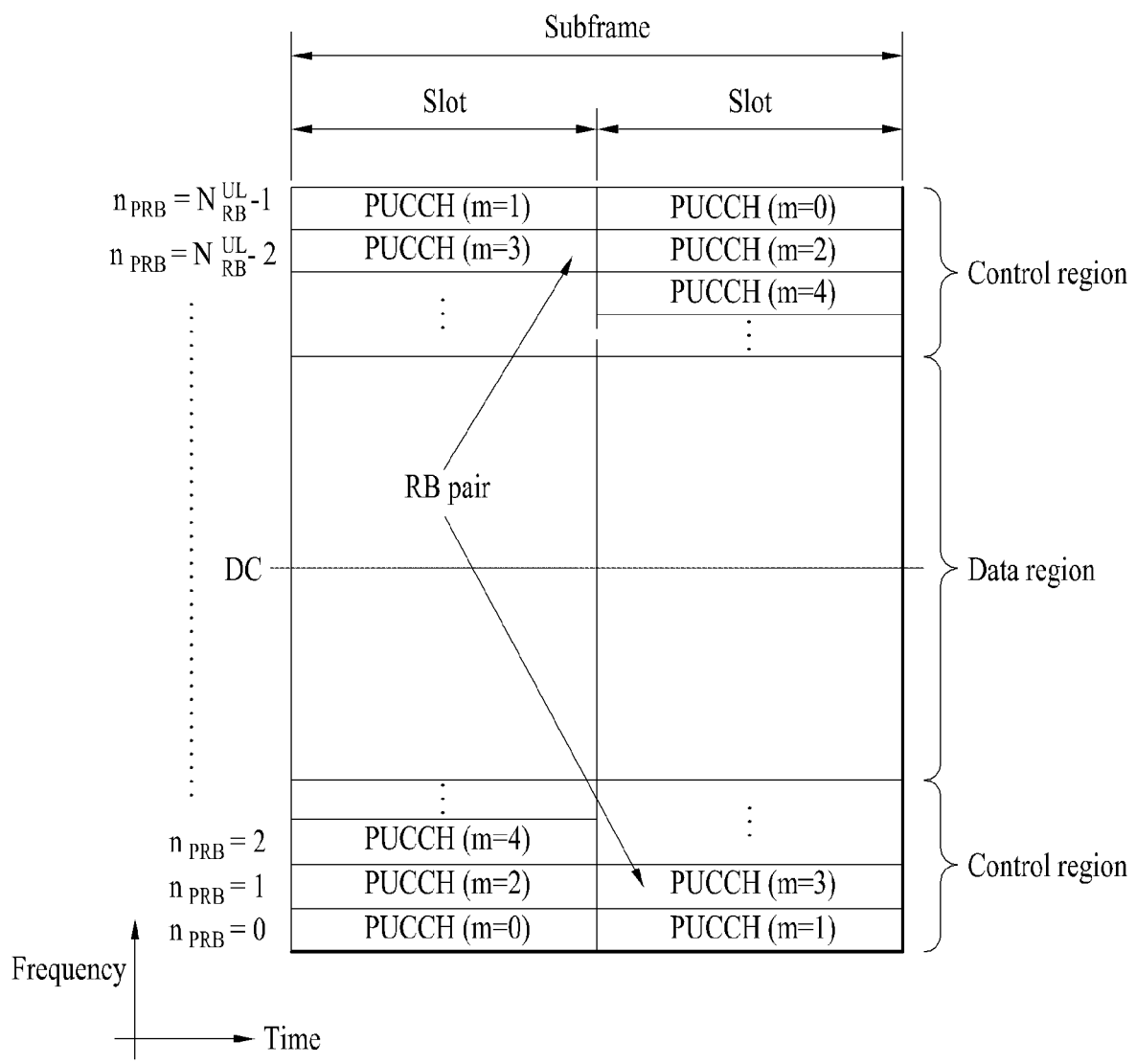
FIG. 4 is a diagram showing an uplink (UL) subframe structure used in a 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 3 shows the mapping relationship between PUCCH formats and UCI in LTE/LTE-A.

TABLE 3

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 3, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

FIG. 5 illustrates configurations of wireless communication systems including multiple antennas.

Referring to FIG. 5(a), when the number of Tx antennas and the number of Rx antennas are respectively to $N_T$ and $N_R$, a theoretical channel transmission capacity is increased, compared to use of a plurality of antennas at only one of a transmitter and a receiver. The channel transmission capacity is increased in proportion to the number of antennas. Therefore, transmission rate and frequency efficiency can be increased remarkably. Given a maximum transmission rate $R_o$ that may be achieved with a single antenna, the transmission rate may be increased, in theory, to the product of $R_o$ and a transmission rate increase rate $R_i$ illustrated in Equation 1 due to an increase in channel transmission capacity in case of multiple antennas.

$$R_i = \min(N_T, N_R) \qquad \text{[Equation 1]}$$

For instance, a MIMO communication system with 4 Tx antennas and 4 Rx antennas may achieve a four-fold increase in transmission rate theoretically, relative to a single-antenna system.

Communication in a MIMO system will be described in detail through mathematical modeling. It is assumed that $N_T$ Tx antennas and $N_R$ Rx antennas exist.

Regarding a transmission signal, up to $N_T$ pieces of information can be transmitted through the $N_T$ Tx antennas, as expressed as the following vector.

$$s = [s_1, s_2, \ldots s_{N_T}]^T \qquad \text{[Equation 2]}$$

A different transmission power may be applied to each piece of transmission information, $s_1, s_2, \ldots, s_{N_T}$. Let the transmission power levels of the transmission information be denoted by $\perp'_1, \perp'_2, \ldots, \perp'_{N_T}$, respectively. Then the transmission power-controlled transmission information vector is given as $$\hat{s} = [\hat{s}_1, \hat{s}_2, \ldots \hat{s}_{N_T}]^T = [Ps_1, Ps_2, \ldots, Ps_{N_T}]^T$$

The transmission power-controlled transmission information vector $\hat{s}$ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

$N_T$ transmission signals $x_1, x_2, \ldots, x_{N_T}$ may be generated by multiplying the transmission power-controlled information vectors by a weight matrix W. The weight matrix W functions to appropriately distribute the transmission information to the Tx antennas according to transmission channel states, etc. These $N_T$ transmission signals $x_1, x_2, \ldots, x_{N_T}$ are represented as a vector X, which may be determined by Equation 5. Herein, $w_{ij}$ denotes a weight between an ith Tx antenna and a jth piece of information. W is called a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{12} & w_{12} & \cdots & w_{2N_T} \\ \vdots & & \ddots & \\ w_{i2} & w_{i2} & \cdots & w_{iN_T} \\ \vdots & & & \ddots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \qquad \text{[Equation 5]}$$

Here, $w_{ij}$ denotes a weight between an i-th Tx antenna and j-th information. W is also called a precoding matrix.

Given NR Rx antennas, signals received at the respective Rx antennas, $y_1, y_2, \ldots, y_{N_R}$ may be represented as the following vector.

$$y = [y_1, y_2, \ldots, y_{N_R}]^T \qquad \text{[Equation 6]}$$

When channels are modeled in the MIMO communication system, they may be distinguished according to the indexes of Tx and Rx antennas and the channel between a j-th Tx antenna and an i-th Rx antenna may be represented as $h_{ij}$. It is to be noted herein that the index of the Rx antenna precedes that of the Tx antenna in $h_{ij}$.

FIG. 5(b) illustrates channels from $N_T$ Tx antennas to an i-th Rx antenna. The channels may be represented as vectors and matrices by grouping them. As illustrated in FIG. 5(b), channels from the $N_T$ Tx antennas to an i-th Rx antenna may be expressed as follows.

$$h_i^T = [h_{i1}, h_{i2}, \ldots, h_{iN_T}]$$

Also, all channels from the $N_T$ Tx antennas to the $N_R$ Rx antennas may be expressed as the following matrix.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{12} & h_{12} & \cdots & h_{2N_T} \\ \vdots & & \ddots & \\ h_{i2} & h_{i2} & \cdots & h_{iN_T} \\ \vdots & & & \ddots \\ h_{N_R 1} & h_{N_R 2} & \cdots & h_{N_R N_T} \end{bmatrix} \qquad \text{[Equation 8]}$$

Actual channels experience the above channel matrix H and then are added with Additive white Gaussian noise (AWGN). The AWGN $n_1, n_2, \ldots, n_{N_R}$ added to the NR Rx antennas is given as the following vector.

$$n = [n_1, n_2, \ldots, n_{N_K}]^T \qquad \text{[Equation 9]}$$

From the above modeled equations, the received signal is given as $$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{12} & h_{12} & \cdots & h_{2N_T} \\ \vdots & & \ddots & \\ h_{i2} & h_{i2} & \cdots & h_{iN_T} \\ \vdots & & & \ddots \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \qquad \text{[Equation 10]}$$

$$Hx + n$$

In the meantime, the numbers of rows and columns in the channel matrix H representing channel states are determined according to the numbers of Tx and Rx antennas. The number of rows is identical to that of Rx antennas, $N_R$ and the number of columns is identical to that of Tx antennas, $N_T$. Thus, the channel matrix H is of size $N_R \times N_T$.

The rank of a matrix is defined as the smaller between the numbers of independent rows and columns. Accordingly, the rank of the matrix is not larger than the number of rows or columns. For example, the rank of the matrix H, rank(H) is limited as follows.

$$\text{rank}(H) \leq \min(N_T, N_R) \qquad \text{[Equation 11]}$$

If the matrix is eigenvalue-decomposed, its rank may be defined as the number of non-zero eigenvalues. Similarly, in case of singular value decomposition (SVD), the rank may be defined as the number of non-zero singular values. Therefore, the rank of a channel matrix physically means the maximum number of different pieces of information that can be transmitted on given channels.

Codebook Based Precoding Scheme

A precoding scheme for appropriately distributing transmission information according to the channel states of antennas is applicable in order to support MIMO transmission. A codebook based precoding scheme refers to a scheme for predetermining a set of precoding matrices between a transmitter and a receiver, measuring channel information from the transmitter at the receiver, feeding a suitable precoding matrix (that is, a precoding matrix index (PMI)) back to the transmitter and applying the suitable precoding matrix to signal transmission at the transmitter. Since a suitable precoding matrix is selected from the predetermined set of precoding matrices, an optimal precoding matrix may not always be applied but feedback overhead can be reduced as compared to explicit feedback of optimal precoding information in actual channel information.

Figure 6:
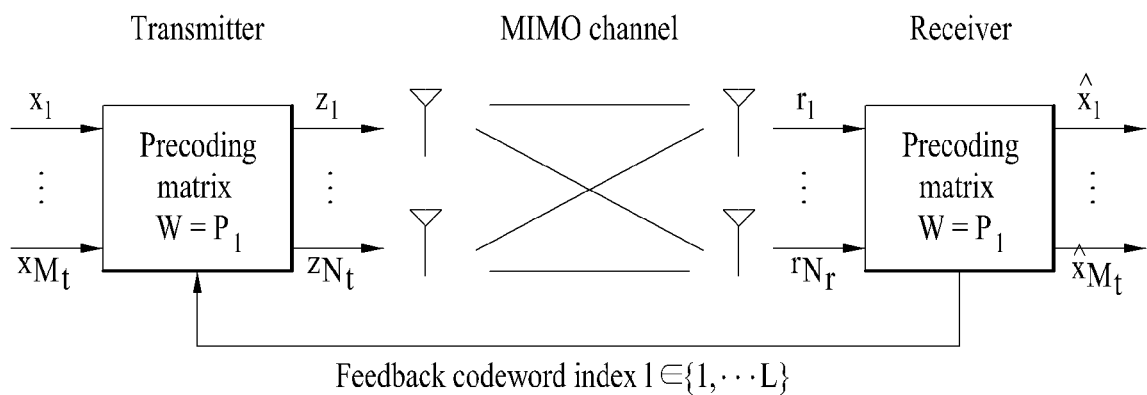
FIG. 6 is a diagram illustrating codebook based beamforming.

FIG. 6 is a diagram illustrating the basic concept of codebook based precoding.

In a codebook based precoding scheme, a transmitter and a receiver share codebook information including a predetermined number of precoding matrices predetermined according to transmission rank, number of antennas, etc. That is, if feedback information is finite, a precoding based codebook scheme may be used. The receiver may measure a channel state via a received signal and feed a finite number of pieces of preferred precoding matrix information (that is, the indices of the precoding matrices) back to the transmitter based on the above-described codebook information. For example, the receiver may measure the received signal using a maximum likelihood (ML) or minimum mean square error (MMSE) method and select an optimal precoding matrix. Although FIG. 6 shows the case in which the receiver transmits precoding matrix information on a per codeword basis, the present invention is not limited thereto.

The transmitter, which has received feedback information from the receiver, may select a specific precoding matrix from the codebook based on the received information. The transmitter, which has selected the precoding matrix, may perform precoding by multiplying layer signals corresponding in number to transmission rank by the selected precoding matrix and transmit the precoded signal via a plurality of antennas. In the precoding matrix, the number of rows is equal to the number of antennas and the number of columns is equal to the rank value. Since the rank value is equal to the number of layers, the number of columns is equal to the number of layers. For example, if the number of transmit antennas is 4 and the number of transmit layers is 2, a 4×2 precoding matrix may be configured. Information transmitted via the layers may be mapped to the antennas via the precoding matrix.

The receiver, which has received the signal precoded and transmitted by the transmitter, may perform an inverse process of precoding performed by the transmitter to restore a received signal. In general, the precoding matrix satisfies a unitary matrix (U) condition such as $U*U^H=I$ and the inverse process of precoding may be performed by multiplying a Hermitian matrix ($P^H$) of the precoding matrix P used for precoding of the transmitter by the received signal.

For example, Table 4 below shows a codebook used for downlink transmission using 2 transmit antennas in 3GPP LTE release-8/9 and Table 5 below shows a codebook used for downlink transmission using 4 transmit antennas in 3GPP LTE release-8/9.

TABLE 4

| Codebook index | Number of rank | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ | — |

TABLE 5

| Codebook index | $u_n$ | Number of layers υ | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

In Table 5 above, $W_n^{\{s\}}$ is obtained by a set {s} composed of an equation $W_n = I - 2u_n u_n^H / u_n^H u_n$. At this time, I denotes a 4×4 unitary matrix and $u_n$ denotes a value given in Table 5.

As shown in Table 4 above, a codebook for 2 transmit antennas has a total of 7 precoding vectors/matrices. Since a unitary matrix is for an open-loop system, the total number of precoding vectors/matrices for precoding of a closed-loop system is 6. In addition, a codebook for 4 transmit antennas shown in Table 5 above has a total of 64 precoding vectors/matrices.

Such a codebook has common properties such as a constant modulus (CM) property, a nested property and a constrained alphabet property. The CM property means that elements of all precoding matrices in the codebook do not include "0" and have the same size. The nested property means that a precoding matrix having a low rank is designed to be composed of a subset of specific columns of a precoding matrix having a high rank. The constrained alphabet property means that the elements of all the precoding matrices in the codebook are constrained. For example, the elements of the precoding matrix may be constrained to only an element ±1 used for binary phase shift keying (BPSK), an element ±1,±j used for quadrature phase shift keying (QPSK) or an element $$\pm 1, \pm j, \pm \frac{(1+j)}{\sqrt{2}}, \pm \frac{(-1+j)}{\sqrt{2}}$$

used for 8-PSK. The example of the codebook of Table 5 above may have the constrained alphabet property since the letters of the elements of all the precoding matrices in the codebook are composed of $$\left\{ \pm 1, \pm j, \pm \frac{(1+j)}{\sqrt{2}}, \pm \frac{(-1+j)}{\sqrt{2}} \right\}.$$

Multi-Antenna Configuration

Figure 7:
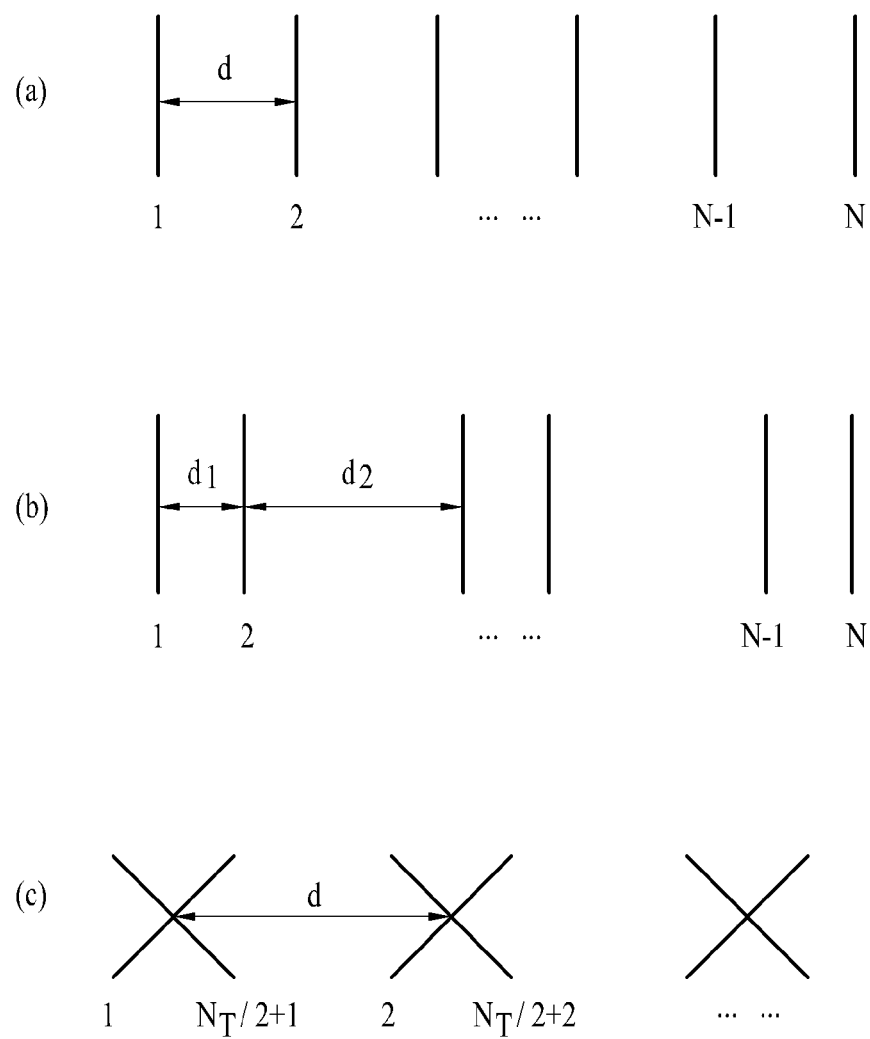
FIG. 7 is a diagram showing the configuration of 8 transmit (Tx) antennas.

FIG. 7 is a diagram showing the configuration of 8 transmit (Tx) antennas.

FIG. 7(a) shows the case in which N antennas configure independent channels without grouping, which is generally referred to as a uniform linear array (ULA). If the number of antennas is small, such a ULA may be used. However, if the number of antennas is large, a space of a transmitter and/or a receiver may be insufficient when a plurality of antennas is arranged to be separated from each other to configure independent channels.

FIG. 7(b) shows a paired ULA in which two antennas forms a pair. In this case, an associated channel is present between the paired antennas and different pairs of antennas may have independent channels.

In legacy 3GPP LTE Release-8/9, four transmit antennas are used in downlink. However, after a 3GPP LTE Release-10 system, 8 transmit antennas may be used in downlink. In order to apply an extended antenna configuration, several transmit antennas should be mounted in a small space. Thus, the ULAs shown in FIGS. 7(a) and 7(b) are not suitable. Accordingly, as shown in FIG. 7(c), a dual-pole (or cross-pole or cross polarization structure) antenna configuration may be applied. If such a transmit antenna configuration is used, although a distance d between antennas is relatively short, antenna correlation may be low to configure independent channels. Therefore, high data transmission throughput can be obtained.

CSI Report

In a 3GPP LTE(-A) system, a user equipment (UE) reports channel state information (CSI) to a base station (BS) and CSI refers to information indicating quality of a radio channel (or a link) formed between the UE and an antenna port. For example, the CSI includes a rank indicator (RI), a precoding matrix indicator (PMI), a channel quality indicator (CQI), etc. Here, the RI indicates rank information of a channel and means the number of streams received by the UE via the same time-frequency resources. Since the value of the RI is determined depending on long term fading of the channel, the RI is fed from the UE back to the BS with periodicity longer than that of the PMI or the CQI. The PMI has a channel space property and indicates a precoding index preferred by the UE based on a metric such a signal to interference plus noise ratio (SINR). The CQI indicates the strength of the channel and means a reception SINR obtained when the BS uses the PMI.

Based on measurement of the radio channel, the UE may calculate a preferred PMI and RI, which may derive an optimal or best transfer rate when used by the BS, in a current channel state and feed the calculated PMI and RI back to the BS. The CQI refers to a modulation and coding scheme for providing acceptable packet error probability for the fed-back PMI/RI.

Meanwhile, in an LTE-A system which includes more accurate MU-MIMO and explicit CoMP operations, current CSI feedback is defined in LTE and thus may not sufficiently support operations to be newly introduced. As requirements for CSI feedback accuracy become more complex in order to obtain sufficient MU-MIMO or CoMP throughput gain, the PMI is composed of two PMIs such as a long term/wideband PMI (W1) and a short term/subband PMI (W2). In other words, a final PMI is expressed by a function of W1 and W2. For example, the final PMI W may be defined as follows: W=W1*W2 or W=W2*W1. Accordingly, in LTE-A, a CSI may be composed of RI, W1, W2 and CQI.

In the 3GPP LTE(-A) system, an uplink channel used for CSI transmission is shown in Table 6 below.

TABLE 6

| Scheduling scheme | Periodic CSI transmission | Aperiodic CSI transmission |
|---|---|---|
| Frequency non-selective | PUCCH | — |
| Frequency selective | PUCCH | PUSCH |

Referring to Table 6, the CSI may be transmitted using a physical uplink control channel (PUCCH) with periodicity determined by a higher layer or may be a periodically transmitted using a physical uplink shared channel (PUSCH) according to the demand of a scheduler. If the CSI is transmitted using the PUSCH, only frequency selective scheduling method and an aperiodic CSI transmission method are possible. Hereinafter, the scheduling scheme and a CSI transmission scheme according to periodicity will be described.

1) CQI/PMI/RI transmission via PUSCH after receiving CSI transmission request control signal.

A control signal for requesting transmission of a CSI may be included in a PUSCH scheduling control signal (UL grant) transmitted via a PDCCH signal. Table 7 below shows the mode of the UE when the CQI, the PMI and the RI are transmitted via the PUSCH.

TABLE 7

| | | PMI feedback type | | |
|---|---|---|---|---|
| | | No PMI | Single PMI | Multiple PMIs |
| PUSCH CQI feedback type | Wideband (wideband CQI) | | | Mode 1-2 |
| | UE selection (subband CQI) | | Mode 2-0 | Mode 2-2 |
| | Higher layer configuration (subband CQI) | Mode 3-0 | Mode 3-1 | |

The transmission mode of Table 7 is selected at a higher layer and the CQI/PMI/RI is transmitted in the same PUSCH subframe. Hereinafter, an uplink transmission method of the UE according to mode will be described.

Mode 1-2 indicates the case in which a precoding matrix is selected on the assumption that data is transmitted via only a subband with respect to each subband. The UE generates a CQI on the assumption that a precoding matrix is selected with respect to an entire set S specified by a higher layer or a system bandwidth. In Mode 1-2, the UE may transmit the CQI and the PMI value of each subband. At this time, the size of each subband may be changed according to system bandwidth.

In mode 2-0, the UE may select M preferred subbands with respect to the set S specified at the higher layer or the system bandwidth. The UE may generate one CQI value on the assumption that data is transmitted with respect to the selected M subbands. The UE preferably reports one CQI (wideband CQI) value with respect to the set S or the system bandwidth. The UE defines the CQI value of each codeword in the form of a difference if a plurality of codewords is present with respect to the selected M subbands.

At this time, the differential CQI value is determined by a difference between an index corresponding to the CQI value of the selected M subbands and a wideband CQI (WB-CQI) index.

In Mode 2-0, the UE may transmit a CQI value generated with respect to a specified set S or an entire set and one CQI value for the selected M subbands to the BS. At this time, the size of the subband and the M value may be changed according to system bandwidth.

In Mode 2-2, the UE may simultaneously select the locations of M preferred subbands and a single precoding matrix for the M preferred subbands on the assumption that data is transmitted via the M preferred subbands. At this time, the CQI value for the M preferred subbands is defined per codeword. In addition, the UE further generates a wideband CQI value with respect to the specified set S or the system bandwidth.

In Mode 2-2, the UE may transmit information about the locations of the M preferred subbands, one CQI value for the selected M subbands, a single PMI for the M preferred subbands, a wideband PMI and a wideband CQI value to the BS. At this time, the size of the subband and the M value may be changed according to system bandwidth.

In Mode 3-0, the UE generates a wideband CQI value. The UE generates the CQI value for each subband on the assumption that data is transmitted via each subband. At this time, even in case of RI>1, the CQI value indicates only the CQI value for a first codeword.

In Mode 3-1, the UE generates a single precoding matrix with respect to the specified set S or the system bandwidth. The UE generates a subband CQI on a per codeword basis on the assumption of the single precoding matrix generated with respect to each subband. In addition, the UE may generate a wideband CQI on the assumption of a single precoding matrix. The CQI value of each subband may be expressed in the form of a difference. The subband CQI value is calculated by a difference between a subband CQI index and a wideband CQI index. At this time, the size of the subband may be changed according to system bandwidth.

2) Periodic CQI/PMI/RI Transmission Via PUCCH

The UE may periodically transmit the CSI (e.g., CQI/PMI/RI information) to the BS via the PUCCH. If the UE receives a control signal for requesting transmission of user data, the UE may transmit the CQI via the PUCCH. Even when the control signal is transmitted via the PUSCH, the CQI/PMI/RI may be transmitted using one of the modes defined in Table 8 below.

TABLE 8

| | | PMI feedback type | |
|---|---|---|---|
| | | No PMI | Single PMI |
| PUCCH CQI feedback type | Wideband (wideband CQI) | Mode 1-0 | Mode 1-1 |
| | UE selection (subband CQI) | Mode 2-0 | Mode 2-1 |

The UE may have the transmission modes shown in Table 8. Referring to Table 8, in Mode 2-0 and Mode 2-1, a bandwidth (BP) part is a set of subbands continuously located in a frequency domain and may cover a system bandwidth or a specified set S. In Table 8, the size of each subband, the size of the BP and the number of BPs may be changed according to system bandwidth. In addition, the UE transmits the CQI in a frequency domain in ascending order per BP so as to cover the system bandwidth or the specified set S.

According to a transmission combination of the CQI/PMI/RI, the UE may have the following four transmission types.

i) Type 1: A subband CQI (SB-CQI) of Mode 2-0 and Mode 2-1 is transmitted.

ii) Type 2: A wideband CQI and a PMI (WB-CQI/PMI) are transmitted.

iii) Type 3: An RI is transmitted.

iv) Type 4: A wideband CQI is transmitted.

If the UE transmits the RI and the wideband CQI/PMI, the CQI/PMI is transmitted in subframes having different offsets and periodicities. In addition, if the RI and the wideband CQI/PMI should be transmitted in the same subframe, the CQI/PMI is not transmitted.

In Table 8, the transmission periodicity of the wideband CQI/PMI and the subband CQI is P and has the following properties.

The wideband CQI/PMI has periodicity of H*P. At this time, H=J*K+1, wherein J denotes the number of BPs and K denotes the number of periodicities of the BP. That is, the UE performs transmission at {0, H, 2H, . . . }.

The CQI is transmitted at a time of J*K rather than when the wideband CQI/PMI is transmitted.

In Table 8, the transmission periodicity of the RI is a multiple m of that of the wideband CQI/PMI and has the following properties.

The offsets of the RI and the wideband CQI/PMI are 0 and, if the RI and the wideband CQI/PMI are transmitted in the same subframe, the wideband CQI/PMI is not transmitted.

Parameters P, H, K and O described in Table 8 are all determined at the higher layer of the UE and signaled to a physical layer of the UE.

Hereinafter, a feedback operation according to the mode of the UE will be described with reference to Table 8. If the UE is in Mode 1-0 and the RI is transmitted to the BS, the UE generates the RI with respect to the system bandwidth or the specified set S and transmits Type 3 report for transmitting the RI to the BS. If the UE transmits the CQI, the wideband CQI is transmitted.

If the UE is in Mode 1-1 and transmits the RI, the UE generates the RI with respect to the system bandwidth or the specified set S and transmits a Type 3 report for transmitting the RI to the BS. If the UE transmits the CQI/PMI, a single precoding matrix is selected in consideration of the recently transmitted RI. That is, the UE transmits a type 2 report composed of a wideband CQI, a single precoding matrix and a differential wideband CQI to the BS.

If the UE is in Mode 2-0 and transmits the RI, the UE generates the RI with respect to the system bandwidth or the specified set S and transmits a Type 3 report for transmitting the RI to the BS. If the UE transmits the wideband CQI, the UE generates the wideband CQI and transmits a Type 4 report to the BS on the assumption of the recently transmitted RI. If the UE transmits the CQI for the selected subband, the UE selects a most preferred subband with respect to J BPs composed of N subbands and transmits a Type 1 report to the BS. The type 1 report may be transmitted via one or more subframes according to the BP.

If the UE is in Mode 2-1 and transmits the RI, the UE generates the RI with respect to the system bandwidth or the specified set S and transmits a Type 3 report for transmitting the RI to the BS. If the UE transmits the wideband CQI to the BS, the UE generates the wideband CQI and transmits a Type 4 report to the BS in consideration of the recently transmitted RI. If the CQI for the selected subbands is transmitted, the UE generates a difference between a single CQI value for the selected subbands in the BP in consideration of the recently transmitted PMI/RI and a CQI of a codeword on the assumption that a single precoding matrix is used for the selected subbands and the recently transmitted RI if the RI is greater than 1 with respect to J BPs composed of Nj subbands and transmits a Type 1 report to the BS.

In addition to estimation (CSI reporting) of the channel state between the BS and the UE, for reduction of an interference signal and demodulation of a signal transmitted between the BS and the UE, various reference signals (RSs) are transmitted between the BS and the UE. The reference signal means a predefined signal having a special waveform, which is transmitted from the BS to the UE or from the UE to the BS and is known to the BS and the UE, and is also referred to as pilot. In 3GPP LTE release 8 (hereinafter, Rel-8), a cell specific reference signal (CRS) is proposed for the purpose of channel measurement of CQI feedback and demodulation of a physical downlink shared channel (PDSCH). However, after 3GPP LTE release 10 (hereinafter, Rel-10), separately from the CRS of Rel-8, a channel state information-reference signal (CSI-RS) for CSI feedback is proposed according to Rel-10.

Each BS may transmit a CSI-RS for channel measurement to the UE via a plurality of antenna ports and each UE may calculate channel state information based on the CSI-RS and transmit the channel state information to each BS in response thereto.

In the LTE-A system after 3GPP LTE Rel-9, when data transmission is performed based on single user (SU)-MIMO, a 4Tx codebook achieves relatively optimized performance compared to codebook overheads with respect to beam characteristics according to 4Tx antennas. However, when data transmission is performed based on multi-user (MU)-MIMO, the codebook does not achieve relatively optimized performance. In particular, it has been asserted that performance improvement is achievable through codebook improvement when the rank is 1 or 2. This is because, when data transmission is performed based on MU-MIMO, an interference channel exists between UEs multiplexed in the spatial domain, the accuracy of a channel fed back by a UE greatly influences not only the performance of the UE which feeds back the channel, but also interference in a UE which is multiplexed, and thus more accurate channel state information (CSI) is required in terms of channel feedback. In this MU-MIMO environment, performance degradation of a Rel-8 4Tx codebook may occur due to one or more factors. For example, the accuracy thereof may be lowered because the number of codewords is insufficient to apply the MU-MIMO scheme, or because a phase difference between antenna groups according to cross-polarization characteristics of antennas is not appropriately reflected. Meanwhile, in the LTE Rel-10 system, an 8Tx codebook is designed to support data transmission based on 8Tx antennas. A method for defining the 8Tx antennas as two co-polarized antenna groups having a uniform linear array (ULA) structure and each including four antennas due to spatial restrictions, and distinguishing the antenna groups using cross-polarization characteristics has been suggested. Accordingly, the 8Tx codebook is designed to appropriately reflect the above antenna structure having cross-polarization characteristics.

In a 3GPP LTE-A system, in order to increase feedback channel accuracy, the 8 Tx codebook is designed by dividing a final precoding matrix indicator (PMI) into W(1) having a long-term and wideband property and W(2) having a short-term and subband property. At this time, as an example of a method of determining a final PMI, hierarchical codebook transformation such as W=norm(W(1)W(2)) may be performed using two pieces of channel information. Here, norm (A) means normalization for enabling a norm value of each column of a matrix A to become 1.

For example, an 8Tx codebook for eight transmit antennas defined in a 3GPP LTE-A system is designed as a codebook having a dual structure from the viewpoint of the above-described hierarchical codebook design and may be expressed by the following equation.

$$W^{(1)}(i) = \begin{bmatrix} X_i & 0 \\ 0 & X_i \end{bmatrix},$$ [Equation 12]

where $X_i$ is Nt/2 by M matrix.

$$W^{(2)}(j) = \begin{bmatrix} \overbrace{e_M^k \quad e_M^l \quad \cdots \quad e_M^m}^{r\ columns} \\ \alpha_j e_M^k \quad \beta_j e_M^l \quad \cdots \quad \gamma_j e_M^m \end{bmatrix}$$

(if rank=r), where $1 \leq k,l,m$ M and k,l,m are integer.

where, $W^{(1)}$ and $W^{(2)}$ (j) denote matrices for i-th and j-th codewords in codeword sets for $W^{(1)}$ and $W^{(2)}$, respectively. In general, in an antenna, antenna elements are located on the same line in the form of a uniform linear array (ULA) and, at this time, a constant interval proportional to a wavelength is maintained between two adjacent antenna elements. Alternatively, an antenna having a cross polarization property may be configured using a wave polarization property. That is, an antenna element having a vertical polarization property and an antenna element having a horizontal polarization property may be located at the same position and thus spatial efficiency is excellent when an antenna array is physically configured.

In a 3GPP LTE-A system, when the 8Tx codebook is designed, the cross polarization antenna is used and, when an interval between the antennas is small, that is, when the distance between the adjacent antennas is equal to or less than half a signal wavelength, a relative phase difference between channels is applied. The cross polarization antenna may be divided into an antenna group having a horizontal polarization property and an antenna group having a vertical polarization property. Each antenna group has a ULA antenna property and the antenna elements of the two antenna groups are located at the same positions. In general, when a channel is modeled in terms of a line of sight (LOS), the same linear phase difference is present between antenna channels in each group having the vertical or horizontal polarization property and only the phase differ between the antenna channel groups having different polarization properties. At this time, since the codebook is expressed by quantizing the channel, the property of the channel may be maximally applied to design the codebook. For example, in case of a rank 1 codeword, for example, such a channel property is applied to a codeword satisfying the following equation.

$$W^{(1)}(i) * W^{(2)}(j) = \begin{bmatrix} X_i(k) \\ \alpha_j X_i(k) \end{bmatrix} \quad \text{[Equation 13]}$$

In the above-described equation, the codeword is expressed by a vector of $N_t \times 1$ and $N_t$ denotes the number of transmit antenna ports. In addition, a high-level vector $X_i(k)$ and a low-level vector $\alpha_j X_i(k)$ are included and indicate an antenna group having a horizontal polarization property and an antenna group having a vertical polarization property, respectively. $X_i(k)$ is expressed by a vector having a linear phase difference property between the antennas of each antenna group. As a representative example thereof, a discrete Fourier transform (DFT) matrix may be used. In addition, $\alpha j$ denotes a phase difference between antenna groups having different polarization properties.

Meanwhile, recently, in a system after 3GPP LTE Rel-12, even in the case of using four transmit antennas, a more sophisticated codebook needs to be designed in order to improve MU-MIMO performance and an improved 4Tx codebook has been discussed. As an example of the improved 4Tx codebook, a codebook having a dual structure has been discussed similarly to the 8Tx codebook structure. That is, when a codebook set for W(1) indicating the wideband and long-term channel and a codeword set for W(2) indicating the subband and short-term channel are present, a 4Tx codebook in which a final codeword is defined as W=W(1)W(2) has been discussed. $W^{(1)}$ may be defined as following equation.

$$W_1(i) = \begin{bmatrix} \tilde{W}_1(i) & 0 \\ 0 & \tilde{W}_1(i)D_a(i) \end{bmatrix}, i \in \{0, 1, \ldots, 7\} \quad \text{[Equation 14]}$$

$$\tilde{W}_1(i) = \begin{bmatrix} 1 & 1 & 1 & 1 \\ e^{j\frac{2\pi(2i \bmod 16)}{16}} & e^{j\frac{2\pi((2i+1)\bmod 16)}{16}} & e^{j\frac{2\pi((2i+2)\bmod 16)}{16}} & e^{j\frac{2\pi((2i+3)\bmod 16)}{16}} \end{bmatrix},$$

$$\{D_a(i)\}_{pq} = \begin{cases} e^{2 \cdot j\frac{2\pi \cdot ((2i+p)\bmod 16)}{16}}, & p = q \\ 0, & p \neq q. \end{cases}$$

In Equation 14, a $D_a(i)$ matrix refers to a diagonal matrix, and has values added to ensure linear phase increment (LPI) characteristics in a co-polarized antenna structure designed for the legacy Rel-10 8Tx codebook. In addition, a set of codewords for $W_2(j)$ may be represented as Equation 15 for rank 1 and Equation 16 for rank 2.

$$W_2(m, n) = \begin{bmatrix} e_n \\ e^{j\frac{\pi m}{2}} e_n \end{bmatrix}, \quad \text{[Equation 15]}$$

$m \in \{0, 1, 2, 3\}, n \in \{1, 2, 3, 4\}$ $$W_2(m, n_1, n_2) = \begin{bmatrix} e_{n_1} & e_{n_2} \\ e^{j\frac{\pi m}{2}} e_{n_1} & -e^{j\frac{\pi m}{2}} e_{n_2} \end{bmatrix}, \quad \text{[Equation 16]}$$

$m \in \{0,1\}, (n_1, n_2) \in \{(1, 1), (2, 2), (3, 3), (4, 4), (1, 2), (2, 3), (1, 4), (2, 4)\}$.

In Equations 15 and 16, $e_n$ is a vector for selecting one of four elements and only an n-th element is defined as 1 while the other values are defined as 0.

Meanwhile, a phase variation of a channel corresponding to each antenna port is proportional to the frequency and time delays. However, in an actual MIMO system, each antenna port may have a different time delay of a channel due to a problem in implementation. When each antenna port has a different time delay as described above, a phase value of a channel for each antenna port has a different variation depending on frequency and thus a beam direction of all antenna ports is frequency selective. In the 3GPP LTE Rel-12 system, a scheme for feeding back PMI information on a subband basis of the frequency axis is being discussed to supplement the frequency-selective beam direction change. However, when the PMI information is fed back on a subband basis, feedback loads (overheads) may be excessive. In particular, the feedback loads according to feedback on a subband basis may be more critical if an improved 4Tx codebook having a larger amount of information to be fed back compared to the legacy Rel-8 codebook is adopted in Rel-12. Accordingly, the improved 4Tx codebook needs to be compressed through, for example, sub-sampling.

The improved 4Tx codebook represented as Equations 14 to 16 may select codewords appropriate for each antenna structure by applying a sub-sampling procedure according to antenna polarization characteristics actually utilized by an eNB, that is, according to whether the antenna structure has co-polarization characteristics or cross-polarization characteristics. For example, for an antenna structure having co-polarization characteristics, Equations 15 and 16 above may be sub-sampled as Equations 17 and 18.

$$W_2(m, n) = \begin{bmatrix} e_n \\ e_n \end{bmatrix}, n \in \{1, 2, 3, 4\} \quad \text{[Equation 17]}$$

$$W_2(m, n_1, n_2) = \begin{bmatrix} e_{n_1} & e_{n_2} \\ e_{n_1} & -e_{n_2} \end{bmatrix}, \quad \text{[Equation 18]}$$

$(n_1, n_2) \in \{(1, 1), (2, 2), (3, 3), (4, 4)\}$.

In addition, for an antenna structure having cross-polarization characteristics, Equations 15 and 16 above may be sub-sampled as Equations 19 and 20.

$$W_2(m, n) = \begin{bmatrix} e_1 \\ e^{j\frac{\pi m}{2}} e_1 \end{bmatrix}, m \in \{0, 1, 2, 3\} \quad \text{[Equation 19]}$$

$$W_2(m, n_1, n_2) = \begin{bmatrix} e_{n_1} & e_{n_2} \\ e^{j\frac{\pi m}{2}} e_{n_1} & -e^{j\frac{\pi m}{2}} e_{n_2} \end{bmatrix}, \quad \text{[Equation 20]}$$

$m \in \{0, 1\}, (n_1, n_2) \in \{(1, 1), (3, 3)\}$.

If sub-sampling is performed as described above, a sub codebook appropriate for co-polarization or cross-polarization characteristics may be utilized with smaller feedback loads.

As described above, appropriate structure and codewords of a codebook may differ according to characteristics of each channel. Therefore, in a future advanced wireless communication system such as LTE Rel-12, a plurality of codebooks specifically adapted to a variety of channel environments may be present and a scheme for appropriately utilizing the codebooks depending upon a channel environment may be considered. The above scheme may also operate as a scheme in which an eNB and UE share information about a plurality of codebooks and the UE selects and feeds back a specific or some codebooks according to an instruction of the eNB. However, since the UE is capable of checking information about a channel environment more accurately compared to the eNB, it may be more appropriate for a variety of channel environments that the UE selects and uses codewords of the codebooks. For example, although the eNB may determine and notify antenna polarization characteristics (i.e., co-polarization or cross-polarization characteristics) to the UE because the antenna polarization characteristics follow the antenna structure of the eNB, since correlation between channels of antennas may differ depending on the location of the UE and a surrounding environment, the eNB may not easily select a codebook appropriate for the corresponding environment. Accordingly, the present invention proposes a feedback scheme for allowing a UE to selectively utilizing codewords of a plurality of codebooks designed to have different structures in consideration of different channel environments. Specifically, when the UE previously knows a plurality of codebooks having different structures, in order to notify the eNB of a codebook selected by the UE, 1) the UE may perform feedback by transmitting a codebook type indicator (CTI) bit indicating which one of a plurality of codebooks having different structures (types, etc.) is selected, or 2) when a plurality of codebooks can be represented as a multi-structure defined as a function having two or more factors, an integrated single codebook may be designed in such a manner that the structure (type, etc.) of a codebook selectable for an (n+1)th factor varies depending on the value of a specific nth factor, and the UE may select and feed back a codeword appropriate for a channel environment. Although an LTE system is assumed as an embodiment of the present invention in the following description, operation of the present invention may be extensively applied to an arbitrary MIMO-based wireless communication system in which channel information is fed back based on a codebook.

Embodiment 1

Selected Codebook Signaling Scheme 1-a) RRC Signaling (eNB)

According to an embodiment of the present invention, when a plurality of codebooks is present, a description is now given of a scheme in which a UE previously shares information about the codebooks with an eNB and receives information about a codebook to be actually fed back among the codebooks, from the eNB. If it is assumed that a plurality of codebooks is present for performance optimization in a variety of channel environments, information about the codebooks may be previously shared between the eNB and UE. In this case, according to operation of the present invention, the eNB may notify the UE of information about codebooks to be actually fed back among the plurality of codebooks, for example, the eNB may transmit the information to the UE using a higher layer signal such as a radio resource control (RRC) signal. For example, it is assumed that codebooks A, B, and C are present, A is the Rel-8 4Tx codebook (improved 4tx codebook), B is a codebook represented as Equations 14, 17, and 18 above (co-polarization sub-sampled codebook), and C is a codebook represented as Equations 14, 19, and 20 above (cross-polarization sub-sampled codebook). In this case, the eNB may set only the codebook A to be fed back such that the UE operates using only the Rel-8 4Tx codebook, or may set the Rel-8 4Tx codebook and the codebook C, in which cross-polarization characteristics are appropriately reflected, to be fed back.

1-b) CTI Bit (UE)

According to an embodiment of the present invention, when a plurality of codebooks is present and a UE knows information about codebooks to be fed back, a description is now given of a scheme for transmitting CTI information indicating which one of the codebooks to be fed back is selected and fed back, by utilizing an additional bit. In the LTE system, the UE feeds back CSI including a rank indicator (RI), channel quality information (CQI), precoding matrix indicator (PMI), etc., and the CSI information may be transmitted to the eNB on a physical uplink control channel (PUCCH) or physical uplink shared channel (PUSCH) among UL channels. In this case, according to operation of the present invention, when the UE selects a specific codebook among two or more codebooks and feeds back a codeword value of the corresponding codebook, information about the specific codebook may be added to the PUCCH and PUSCH. Specifically, if it is assumed that two codebooks such as the Rel-8 4Tx codebook A and the Rel-12 4Tx codebook C represented as Equations 14, 19, and 20 are set to be fed back for a specific UE, the UE may notify the eNB as to which one of the codebooks A and C is selected by the UE, by adding 1-bit information to the PUCCH and PUSCH.

1-c) CTI+CSI Combination Scheme

According to an embodiment of the present invention, when a plurality of codebooks is present and a UE knows information about codebooks to be fed back, the UE may notify an eNB of CTI information indicating which one of the codebooks to be fed back is selected and fed back, by combining the CTI information with CSI information. The UE may joint code information indicating which one of one or more codebooks to be fed back is selected (i.e., CTI), with RI information and transmit the coded information to the eNB. Among the RI, CQI, and PMI of the CSI, since the RI is determined first and then the PMI and CQI are determined, if the RI information and CTI information are combined as described above, it may be guaranteed that the codebook selected for the CTI is also applied to the corresponding RI, CQI, and PMI. On the other hand, when channel information other than the RI is combined and transmitted with the CTI, it should be guaranteed that related pieces of the CSI information are calculated using the same codebook selected for the CTI value. For example, when PMI information and CTI information for W1 are combined, the UE assumes that RI has been calculated and determined based on a codebook designated by the CTI information. In particular, in a periodic feedback procedure based on PUCCH, since the feedback cycle is large in the order of RI and PMI/CQI, it may be more advantageous to combine and transmit RI information with CTI information when the RI information is fed back. If PMI information and CTI information for W1 are combined in the PUCCH-based feedback procedure, since a codebook according to RI information transmitted before the PMI transmission for $W_1$ is transmitted can be changed according to the CTI information, the UE should store the RI information in a buffer or the like and analyze the same after a time delay. On the other hand, in a PUSCH-based feedback procedure, RI, CQI, and PMI may be simultaneously transmitted and thus arbitrary CSI and CTI may be combined and transmitted together without the above problem.

1-d) CTI Bit Utilization+Example

According to an embodiment of the present invention, when a UE knows information about a codebook to be fed back among a plurality of codebooks and notifies an eNB of CTI information indicating which one of the codebooks is selected and fed back by the UE, a description is now given of an operation in which the eNB sets validity of the CTI. In a wireless communication system such as LTE, when UEs feed back CSI information, each UE is generally configured to feed back CSI information which is the most advantageous when the UE operates using an SU-MIMO scheme. However, when a plurality of codebooks is present, an appropriate codebook may differ according to SU-MIMO or MU-MIMO operation. For example, it is assumed that codebook A appropriate for SU-MIMO and codebook B appropriate for MU-MIMO among a plurality of codebooks are set for a UE. In this case, the UE may select an optimal codebook after actually testing both codebooks A and B, and transmit CTI information about the selected codebook to the eNB. In this case, CSI information transmitted by the UE is based on the selected codebook indicated by the CTI information.

However, if the above-mentioned typical CSI feedback procedure, i.e., SU-MIMO-based CSI feedback procedure is performed, the UE may select only a codebook appropriate for SU-MIMO. Accordingly, the BS may provide an instruction on validity of the CTI information to the UE to control the above-described operation. That is, the eNB may instruct the UE to actually select a codebook and feed back corresponding CTI information, or to actually use a codebook set by the eNB and feed back CTI information to indicate a codebook recommended by the UE. In the latter case, the UE selects and uses one of the codebooks in a feedback procedure according to a higher layer signal, for example, an RRC signal, set by the eNB, provides the CTI to the eNB to indicate a codebook preferred by the UE when SU-MIMO is assumed, and actually selects and feeds back codewords from the codebook instructed by the BS regardless of the CTI. In this case, the CTI information may indicate a single codebook or two or more codebooks among a plurality of codebooks.

Embodiment 2

Integrated Codebook Design Scheme

According to another embodiment of the present invention, when a plurality of codebooks having different structures is present and can be represented as a multi-structure defined as a function having two or more factors, a description is now given of a scheme in which an integrated single codebook is designed in such a manner that the structure of a codebook selectable for an (n+1)th factor varies depending on the value of a specific nth factor, and a UE selects and feeds back a codeword appropriate for a channel environment.

Although the LTE Rel-8 4Tx codebook is designed in consideration of both cases in which correlations between antennas are high and low, codebooks derived from the Rel-10 8Tx codebook structure, for example, Equations 14 to 20 above, consider a case in which correlations between antennas are relatively high. Accordingly, it is preferable to adaptively utilize the two codebooks depending on correlations between antennas. As one scheme for utilizing the two codebooks, CTI information proposed by the present invention may be used. However, when the codebooks can be represented as a multi-structure defined as a function having two or more factors, an integrated single codebook may be designed in such a manner that the structure of a codebook selectable for an (n+1)th factor varies depending on the value of a specific nth factor, and the UE may select and feed back a codeword appropriate for a channel environment.

For convenience's sake, it is assumed that the Rel-8 4Tx codebook is codebook A, and the improved 4Tx codebook represented as Equation 14 to 16 is codebook B. It is also assumed that an ultimate precoding matrix can be represented as $W=W_1*W_2$, and N bits are allocated to $W_1$ while M bits are allocated to $W_2$. In this case, among $2^N$ states expressible using N bits, $W=I*W_A$ may be set when some states are selected and $W=W_{1,B}*W_{2,B}$ may be set when the other states are selected. Here, $W_A$ refers to a precoding matrix according to the codebook A, and $W_{1,B}$ and $W_{2,B}$ respectively refer to precoding matrices for $W_1$ and $W_2$ according to the codebook B. When precoding information for a broadband channel and precoding information for a subband channel are present, this single codebook structure may be described as a form in which a codebook utilized to determine precoding of the subband channel is dependent upon the precoding information selected for the broadband channel.

A specific example of the single codebook structure is as follows. It is assumed that N=3 bits and M=4 bits. In this case, $W_1$ may have 8 state values such as '0', '1', . . . , '7'. Here, when state '0' is selected for $W_1$, a codebook for $W_1$ may be defined as a 4×4 identity matrix, and 16 states generated due to 4 bits for $W_2$ may be used to indicate the Rel-8 4Tx codebook represented as shown in Table 5 above. Table 9 shows an example thereof. Here, $i_1$ and $i_2$ respectively refer to a codeword index for the codebook $W_1$ and a codeword index for the codebook $W_2$.

TABLE 9

| $i_2(i_1=0)$ | $u_n$ | Number of layers υ | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |

TABLE 9-continued

| $i_2(i_1 = 0)$ | $u_n$ | Number of layers $\upsilon$ | | | |
|---|---|---|---|---|---|
| | | 1 | 2 | 3 | 4 |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

In Table 9, $W_n^{\{s\}}$ refers to a matrix defined by columns given by a set $\{s\}$ from $W_n = I - 2u_n u_n^H / u_n^H u_n$.

In this case, the other seven states '1', . . . , '7' may be utilized to indicate some of the codebooks for $W_1$ of the improved 4Tx codebook of Rel-12 represented as Equation 14 above. At this time, 4 bits for $W_2$ may be utilized to represent Equation 15 for rank 1 and Equation 16 for rank 2. The following tables show an example thereof

TABLE 10

| | $i_2$ | | | |
|---|---|---|---|---|
| $i_1$ | 0 | 1 | 2 | 3 |
| 1-7 | $W_{2i_1,0}^{(1)}$ | $W_{2i_1,1}^{(1)}$ | $W_{2i_1,2}^{(1)}$ | $W_{2i_1,3}^{(1)}$ |

| | $i_2$ | | | |
|---|---|---|---|---|
| $i_1$ | 4 | 5 | 6 | 7 |
| 1-7 | $W_{2i_1+1,0}^{(1)}$ | $W_{2i_1+1,1}^{(1)}$ | $W_{2i_1+1,2}^{(1)}$ | $W_{2i_1+1,3}^{(1)}$ |

| | $i_2$ | | | |
|---|---|---|---|---|
| $i_1$ | 8 | 9 | 10 | 11 |
| 1-7 | $W_{2i_1+2,0}^{(1)}$ | $W_{2i_1+2,1}^{(1)}$ | $W_{2i_1+2,2}^{(1)}$ | $W_{2i_1+2,3}^{(1)}$ |

| | $i_2$ | | | |
|---|---|---|---|---|
| $i_1$ | 12 | 13 | 14 | 15 |
| 1-7 | $W_{2i_1+3,0}^{(1)}$ | $W_{2i_1+3,1}^{(1)}$ | $W_{2i_1+3,2}^{(1)}$ | $W_{2i_1+3,3}^{(1)}$ | where $W_{m,n}^{(1)} = \dfrac{1}{\sqrt{4}}\begin{bmatrix} v_m \\ \varphi_{n,m} v_m \end{bmatrix}$

TABLE 11

| | $i_2$ | | | |
|---|---|---|---|---|
| $i_1$ | 0 | 1 | 2 | 3 |
| 1-7 | $W_{2i_1,2i_1,0}^{(2)}$ | $W_{2i_1,2i_1,1}^{(2)}$ | $W_{2i_1+1,2i_1+1,0}^{(2)}$ | $W_{2i_1+1,2i_1+1,1}^{(2)}$ |

| | $i_2$ | | | |
|---|---|---|---|---|
| $i_1$ | 4 | 5 | 6 | 7 |
| 1-7 | $W_{2i_1+2,2i_1+2,0}^{(2)}$ | $W_{2i_1+2,2i_1+2,1}^{(2)}$ | $W_{2i_1+3,2i_1+3,0}^{(2)}$ | $W_{2i_1+3,2i_1+3,1}^{(2)}$ |

| | $i_2$ | | | |
|---|---|---|---|---|
| $i_1$ | 8 | 9 | 10 | 11 |
| 1-7 | $W_{2i_1,2i_1+1,0}^{(2)}$ | $W_{2i_1,2i_1+1,1}^{(2)}$ | $W_{2i_1+1,2i_1+2,0}^{(2)}$ | $W_{2i_1+1,2i_1+2,1}^{(2)}$ |

| | $i_2$ | | | |
|---|---|---|---|---|
| $i_1$ | 12 | 13 | 14 | 15 |
| 1-7 | $W_{2i_1,2i_1+3,0}^{(2)}$ | $W_{2i_1,2i_1+3,1}^{(2)}$ | $W_{2i_1+1,2i_1+3,0}^{(2)}$ | $W_{2i_1+1,2i_1+3,1}^{(2)}$ | where $W_{m,m',n}^{(2)} = \dfrac{1}{4}\begin{bmatrix} v_m & v_{m'} \\ \varphi_{n,m} v_m & -\varphi_{n,m'} v_{m'} \end{bmatrix}$ In Tables 10 and 11, $\varphi_{n,m} = e^{j\pi(n/2+m/4)}$, $v_m = [1\ e^{j2\pi m/16}]^T$.

Table 10 shows rank 1, and Table 11 shows rank 2.

Here, although the Rel-8 4Tx codebook is utilized as the codebook $W_2$ for one state indicated by a bit corresponding to $W_1$, the Rel-8 4Tx codebook may be utilized as the codebook $W_2$ for two or more states. For example, a precoding matrix of $W_1$ for four states may be defined as Equation 20, and a codebook may be designed in such a manner that 4 bits of $W_2$ for each state select one of Rel-8 4Tx codebooks.

$$W_{1,k} = \text{diag}(1, e^{j\theta_k}, e^{j2\theta_k}, e^{j3\theta_k}),\qquad\text{[Equation 20]}$$

where k=0, 1, 2, 3, and $[\theta_0\ \theta_1\ \theta_2\ \theta_3] = [0\pi/8\ \pi/16\ \pi/32]$.

Figure 8:
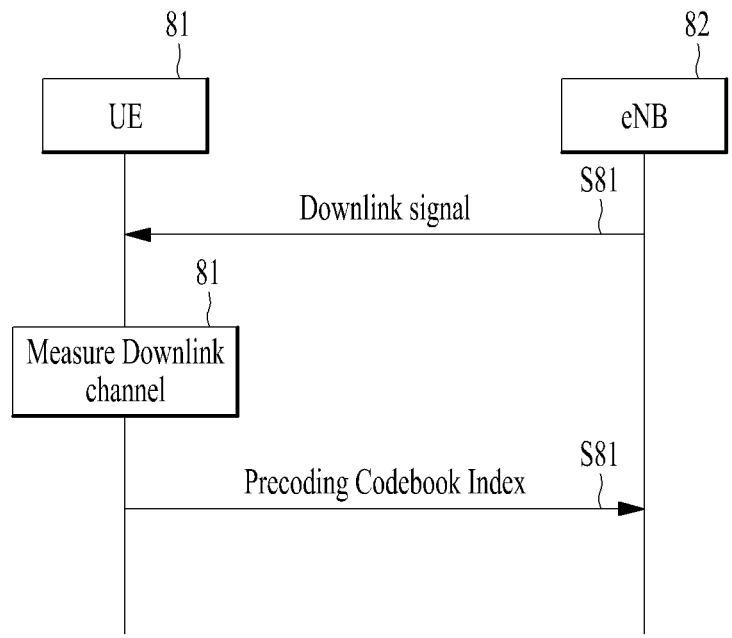
FIG. 8 is a diagram showing operation according to one embodiment of the present invention.

FIG. 8 is a diagram showing operation according to one embodiment of the present invention.

A UE 81 receives a DL signal from an eNB 82 (S81). The DL signal may be precoded based on a codebook as described above. A description of the precoding based on a codebook is provided above and thus is omitted here.

The UE 81 may measure a DL channel based on the DL signal (S82). By measuring the DL channel, channel state information (CSI) including RI, PMI, and CQI may be reported to the eNB 82 (S83), and only the PMI of the CSI is considered in the current embodiment.

The codebook for precoding may include an integrated codebook having a dual structure including a codebook for a wideband and a codebook for a subband.

The integrated codebook may be determined depending on an index $i_1$ of the codebook for the wideband and an index $i_2$ of the codebook for the subband, and the structure or type of a codebook selectable using the index $i_2$ may vary according to the index Meanwhile, FIG. 8 illustrates and describes only a part of the previous embodiments of the present invention, and the UE 81 or the eNB 82 may execute one or more of the embodiments of the present invention in a combined manner.

Figure 9:
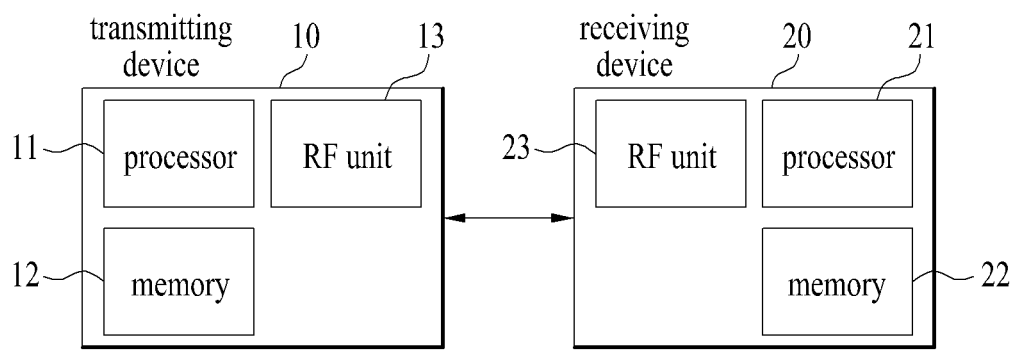
FIG. 9 is a block diagram of an apparatus for implementing embodiment(s) of the present invention.

FIG. 9 is a block diagram of a transmitting device 10 and a receiving device 20 configured to implement exemplary embodiments of the present invention. Referring to FIG. 9, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr receive antennas and frequency down-converts each signal received through receive antennas into a baseband signal. The RF unit 23 may include an oscillator for frequency down-conversion. The processor 21 decodes and demodulates the radio signals received through the receive antennas and restores data that the transmitting device 10 wishes to transmit.

The RF units 13 and 23 include one or more antennas. An antenna performs a function of transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

In embodiments of the present invention, a UE serves as the transmission device 10 on uplink and as the receiving device 20 on downlink. In embodiments of the present invention, an eNB serves as the receiving device 20 on uplink and as the transmission device 10 on downlink.

The transmitting device and/or the receiving device may be configured as a combination of one or more embodiments of the present invention.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

According to an embodiment of the present invention, a DL wireless signal may be efficiently received.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

The present invention is applicable to a wireless communication device such as a UE, relay, or BS.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for reporting a channel state to a base station (BS) supporting downlink (DL) multiple-input multiple-output (MIMO) in a wireless communication system, the method comprising:
   measuring a DL channel based on a DL signal received from the BS; and
   reporting an index of a codebook for precoding of the DL signal according to the measured DL channel,
   wherein the codebook for precoding comprises an integrated codebook having a dual structure comprising a first codebook for a wideband and a second codebook for a subband, and
   wherein the integrated codebook is determined by an index $i_1$ for the first codebook and an index $i_2$ for the second codebook, and the index $i_1$ determines a type of the second codebook to be selected by the index $i_2$.

2. The method according to claim 1, wherein the second codebook comprises a sub-codebook obtained by sub-sampling the second codebook according to antenna polarization characteristics.

3. The method according to claim 1, comprising receiving information about a type of the integrated codebook used by the BS, from the BS,
   wherein the integrated codebook comprises at least one of legacy (Rel-8) codebooks for 4 transport (Tx) antenna ports, improved 4Tx codebooks obtained by reflecting linear phase increment (LPI) characteristics to the legacy codebooks, a first sub codebook obtained by subsampling the improved 4Tx codebooks according to a co-polarized antenna structure, and a second sub codebook obtained by sub-sampling the improved 4Tx codebooks according to a cross-polarization antenna structure.

4. The method according to claim 3, wherein the first codebook among the improved 4Tx codebooks is represented as:

$$W_1(i) = \begin{bmatrix} \tilde{W}_1(i) & 0 \\ 0 & \tilde{W}_1(i)D_a(i) \end{bmatrix}, i \in \{0, 1, \ldots, 7\},$$

$$\tilde{W}_1(i) = \begin{bmatrix} 1 & 1 & 1 \\ e^{j\frac{2\pi(2i\bmod 16)}{16}} & e^{j\frac{2\pi((2i+1)\bmod 16)}{16}} & e^{j\frac{2\pi((2i+2)\bmod 16)}{16}} \\ \\ 1 \\ e^{j\frac{2\pi((2i+3)\bmod 16)}{16}} \end{bmatrix}, \text{ and}$$

$$\{D_a(i)\}_{pq} = \begin{cases} e^{2j\frac{2\pi\cdot((2i+p)\bmod 16)}{16}}, & p=q \\ 0, & p \neq q. \end{cases}$$

5. The method according to claim 3, wherein the second codebook among the improved 4Tx codebooks is represented as:

$$W_2(m,n) = \begin{bmatrix} e_n \\ e^{j\frac{\pi m}{2}}e_n \end{bmatrix}$$

for rank 1,
where $m \in \{0,1,2,3\}$ and $n \in \{1,2,3,4\}$; and $$W_2(m, n_1, n_2) = \begin{bmatrix} e_{n_1} & e_{n_2} \\ e^{j\frac{\pi m}{2}}e_{n_1} & -e^{j\frac{\pi m}{2}}e_{n_2} \end{bmatrix}$$

for rank 2,
where $m \in \{0,1\}$ and $(n_1, n_2) \in \{(1,1), (2,2), (3,3), (4,4), (1,2), (2,3), (1,4), (2,4)\}$,
where $e_n$ is a vector for selecting one of four elements, and only an n-th element is defined as 1 while other values are defined as 0.

6. The method according to claim 3, wherein the first sub codebook is represented as:

$$W_2(m,n) = \begin{bmatrix} e_n \\ e_n \end{bmatrix}$$

for rank 1,
where $n \in \{1,2,3,4\}$; and $$W_2(m, n_1, n_2) = \begin{bmatrix} e_{n_1} & e_{n_2} \\ e_{n_1} & -e_{n_2} \end{bmatrix}$$

for rank 2,
where $(n_1, n_2) \in \{(1,1), (2,2), (3,3), (4,4)\}$,
where $e_n$ is a vector for selecting one of four elements, and only an n-th element is defined as 1 while other values are defined as 0.

7. The method according to claim 3, wherein the second sub codebook is represented as:

$$W_2(m,n) = \begin{bmatrix} e_1 \\ e^{j\frac{\pi m}{2}}e_1 \end{bmatrix}$$

for rank 1,
where $m \in \{0,1,2,3\}$; and $$W_2(m, n_1, n_2) = \begin{bmatrix} e_{n_1} & e_{n_2} \\ e^{j\frac{\pi m}{2}}e_{n_1} & -e^{j\frac{\pi m}{2}}e_{n_2} \end{bmatrix}$$

for rank 2,
where $m \in \{0,1\}$ and $(n_1, n_2) \in \{(1,1), (3,3)\}$,
where $e_n$ is a vector for selecting one of four elements, and only an n-th element is defined as 1 while other values are defined as 0.

8. The method according to claim 1, wherein, when three bits are set for the first codebook, if the three bits indicate 0, the first codebook is set as an identity matrix and the second codebook is set as a legacy (Rel-8) codebook for 4Tx antenna ports.

9. The method according to claim 1, wherein, when three bits are set for the first codebook, if the three bits indicate 1 to 7, the first codebook is set as an identity matrix and the second codebook is set as an improved 4Tx codebook.

10. A user equipment (UE) configured to report a channel state to a base station (BS) supporting downlink (DL) multiple-input multiple-output (MIMO) in a wireless communication system, the UE comprising:
a radio frequency (RF) unit; and
a processor configured to:
control the RF unit;
measure a DL channel based on a DL signal received from the BS; and
report an index of a codebook for precoding of the DL signal according to the measured DL channel,
wherein the codebook for precoding comprises an integrated codebook having a dual structure comprising a first codebook for a wideband and a second codebook for a subband, and
wherein the integrated codebook is determined by an index $i_1$ for the first codebook and an index $i_2$ for the second codebook, and the index $i_1$ determines a type of the second codebook to be selected by the index $i_2$.

11. A base station (BS) supporting downlink (DL) multiple-input multiple-output (MIMO) in a wireless communication system, the BS comprising:
a radio frequency (RF) unit; and
a processor configured to:
control the RF unit;
transmit a downlink (DL) signal to a user equipment (UE); and
receive an index of a codebook for precoding of the DL signal according to a DL channel measured based on the DL signal,
wherein the codebook for precoding comprises an integrated codebook having a dual structure comprising a first codebook for a wideband and a second codebook for a subband, and
wherein the integrated codebook is determined by an index $i_1$ for the first codebook and an index $i_2$ for the second codebook, and the index $i_1$ determines a type of the second codebook to be selected by the index $i_2$.

* * * * *